UNITED STATES PATENT OFFICE.

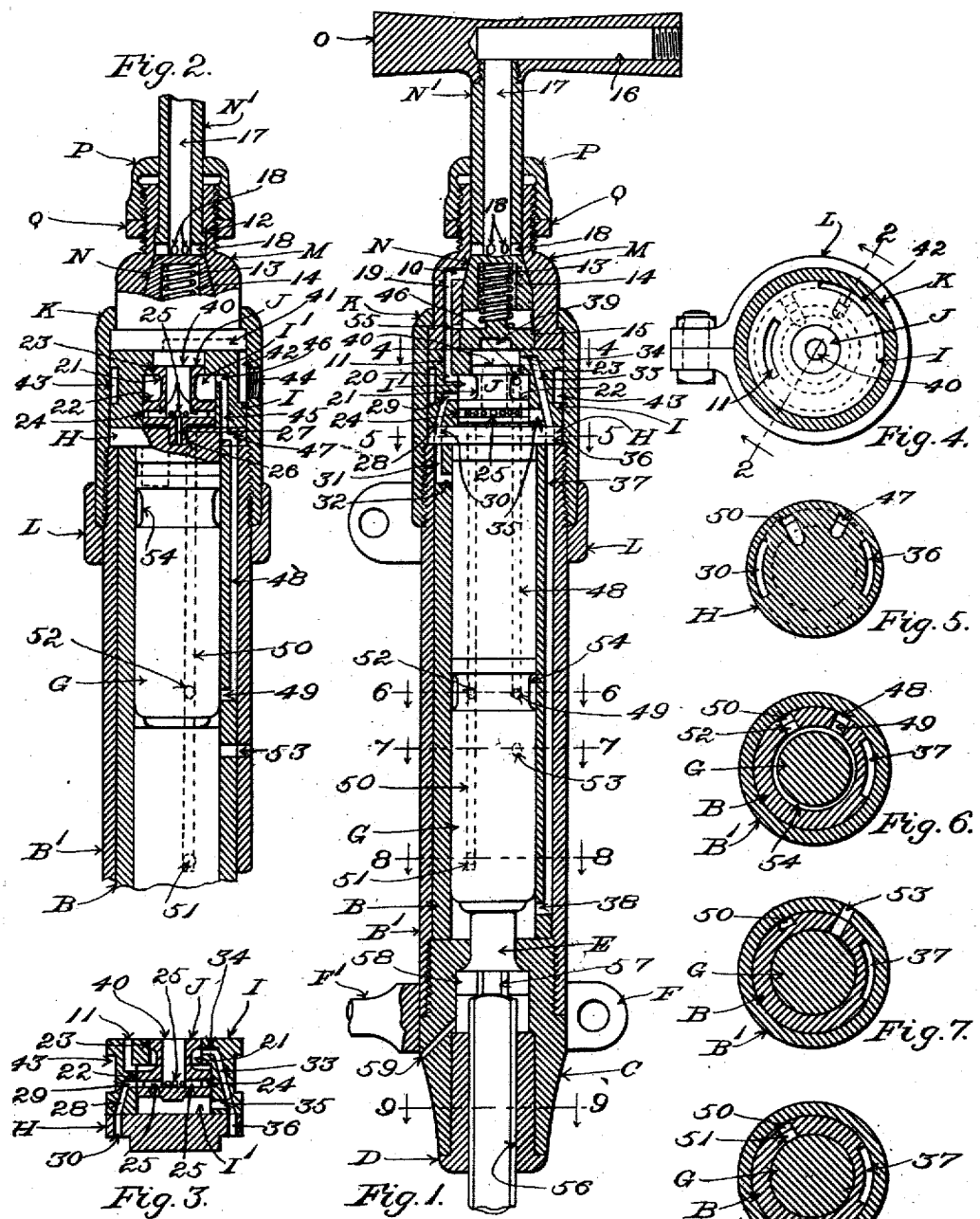

GEORGE L. BADGER, OF QUINCY, MASSACHUSETTS.

IMPACT-TOOL.

No. 814,661.  Specification of Letters Patent.  Patented March 13, 1906.

Application filed February 8, 1905. Serial No. 244,765.

*To all whom it may concern:*

Be it known that I, GEORGE L. BADGER, of Quincy, in the county of Norfolk and State of Massachusetts, have invented certain new and useful Improvements in Impact-Tools, of which the following is a specification.

The principal features of the present invention relate to the novel valve mechanism for controlling the movements of the piston.
The greatest difficulty with fluid-actuated valves as heretofore constructed has been that after a short period of service the fluid will leak by the bearing-surfaces of the valve and create a pressure on the controlling-pressure surfaces which interferes with the proper operation of the valve.

It is the object of the novel valve constituting this feature of my invention to prevent the fluid that may leak past the bearing-surfaces from creating a pressure on the controlling-pressure surfaces of the valve, the fluid passing into the exhaust and not interfering with the proper operation of the valve, whereby the life of the latter is greatly prolonged.

When fluid-actuated valves are controlled by the movements of the piston and are actuated by means of fluid supplied to and exhausted from ports and passages controlled by the latter as ordinarily arranged, the fluid which leaks past the piston when the latter becomes slightly worn also interferes with the proper operation of the valve.

It is the object constituting the second feature of my invention to prevent the fluid leaking past the piston from interfering with the proper operation of the valve, whereby the life of the former is greatly prolonged.

In the practical operation of pneumatic tools as ordinarily constructed the leak of motive fluid past the valve and piston interferes with the proper working of the tool before the waste of fluid becomes great enough to be taken into account.

It will be understood that while a larger amount of motive fluid will be required to operate a tool when part of the fluid supplied escapes past the valve and piston when constructed in accordance with my invention the escaping fluid does not interfere with the proper working of the tool.

Another feature relates to an auxiliary exhaust-port in the valve-block controlled by the valve, whereby additional means is provided for exhausting the motive fluid from the forward end of the piston-chamber.

It is desirable in impact-tools that the exhaust from the forward side of the piston shall be as free as possible in order that the speed of the piston will not be retarded, so that the force of the blow delivered by the latter on the working tool will not be cushioned by the back pressure of the exhaust. It is also desirable that the amount of motive fluid admitted to the forward end of the piston-chamber shall be comparatively limited, so that the piston will not be driven rearwardly with great force.

I provide the passage leading from the valve-block to the forward end of the piston-chamber, through which the motive fluid is admitted and exhausted from the forward side of the piston, with two ports controlled by the valve. One of these ports serves to admit and exhaust the motive fluid to and from the forward end of the piston and is of such capacity as to drive the piston rearwardly at the required speed. The second or auxiliary port, which is of much greater capacity, serves as additional means to exhaust the fluid from the forward end of the piston when the valve is in one position and when the valve is moved in an opposite direction to admit an additional amount of fluid to maintain a pressure on the larger area of the valve. This last feature of itself, however, is not of great importance, as I provide other means for maintaining a pressure on the larger area of the valve during the rearward stroke of the piston, as will be hereinafter described; but as the larger area of the valve is connected by means of said auxiliary port and the passage leading to the forward end of the piston-chamber when the latter is opened to the atmosphere by a port uncovered by the piston when near the end of its rearward stroke said auxiliary port and passage furnishes additional means of large capacity for quickly relieving the pressure from the larger area of the valve, whereby the latter can be moved quickly by the motive fluid that is constantly admitted to the differential pressure-surfaces of the valve, as will be hereinafter described.

In the novel valve mechanism of this invention the valve consists of a tubular shell of different diameters provided with an annular groove located between the large and small diameters or bearing-surfaces of the shell. The motive fluid is constantly admitted to said annular groove and acting on the differential area of the walls thereof tends to press the valve always in one direction. The shell is provided with another annular groove located in the larger diameter, said groove being connected with the interior of the shell by a series of holes or ports, the interior surface of the valve being always open to the atmosphere by an exhaust-passage in connection with one end of the valve-chamber. The valve is preferably closed at one end, as it can thus be made shorter and provides a larger pressure-surface at one end; but this construction is not essential to the broader scope of my invention, as will be apparent from the description hereinafter given and from the terms of my respective claims. It follows from the construction of the valve and arrangement of the ports in the valve-block that the motive fluid which is admitted to the annular groove between the large and small bearing-surfaces of the valve to press the latter in one direction and from which groove the motive fluid is alternately supplied to opposite ends of the piston-chamber that said fluid cannot reach the pressure-surfaces of the valve. The fluid that may leak or escape past the bearing-surfaces of the valve cannot create a pressure on the pressure-surfaces of the valve. As in the case of the larger bearing-surface the fluid will enter the annular groove therein and pass through the holes connecting said groove with the interior of the valve, which, as before stated, is always open to the atmosphere. In the case of the smaller bearing-surface the fluid escaping past the same cannot create a pressure on that end of the valve, as said end is always open to the atmosphere. The valve is provided with a pressure-surface of larger area than the effective area of said differential pressure-surfaces, the motive fluid being intermittently admitted to said pressure-surface of larger area to move the valve in an opposite direction. In the preferred construction where one end of the valve is closed the intermittent fluid-pressure is admitted to the large closed end of the valve. In a modified construction of the valve the large diameter is provided with a small projecting end which fits into a bore in the plate which closes the forward end of the valve-chamber, both ends of the valve in this instance being open to the atmosphere, the intermittent fluid-pressure being admitted to the annular shoulder formed by the large diameter of the valve and said projecting end. To prevent the motive fluid that may escape past the piston or from other causes to the larger area of the valve from affecting or interfering with the movement of the latter, I provide the passage leading from the larger area of the valve to the piston-chamber with an auxiliary port controlled by the piston, said port being located near the forward end of the piston-chamber and being closed by the piston when the latter approaches the forward end of its stroke. The passage from the large area of the valve to the piston-chamber is provided with an admission-port controlled by the piston and adapted to actuate the valve in one direction, as is usual in tools of this class provided with differential valves. An exhaust-port is opened by the piston near the end of its rearward stroke to allow the valve to move in an opposite direction. The auxiliary port when uncovered by the piston is alternately placed in communication with the supply of motive fluid and with the atmosphere by means of the valve-controlled passage leading to the forward end of the piston-chamber through which the fluid is admitted and exhausted from the forward end of the piston by the shifting of the valve, whereby an additional amount of fluid is supplied to the large area of the valve on one stroke of the piston and the fluid exhausted from said area of the valve on the opposite stroke of the piston. It will be understood that the fluid admitted and exhausted by means of the said auxiliary port to and from the large area of the valve occurs when the piston is moving in an opposite direction from that in which it is moving when the fluid is admitted and exhausted, respectively, by the beforementioned admission and exhaust ports to and from the large area of the valve to shift the valve. The auxiliary port is closed by the piston before the admission-port is opened to admit fluid to the large area of the valve to shift the latter, so that the fluid cannot escape through the auxiliary port, and the latter can be of large capacity. It results from this construction and arrangement that the motive fluid is admitted to the large area of the valve during the greater part of the stroke of the piston in one direction and exhausted from said area of the valve during the greater part of the opposite stroke of the piston, whereby the valve is positively held in its respective position during the stroke of the piston in each direction.

In tools of this class as ordinarily constructed the motive fluid is admitted to the larger pressure-surface of the valve when the piston is near one end of its stroke to shift the valve and the fluid exhausted from said surface when the piston is near the opposite end of its stroke to allow the constantly-acting pressure on the smaller area to shift the valve in an opposite direction. During the intermediate travel of the piston the admission and exhaust ports to the larger pressure-surface of the valve are closed by the piston. When the fluid has been exhausted from the larger pressure-surface of the valve to shift the latter and the piston in its travel has closed the exhaust-port from the valve, if the motive fluid reaches or escapes to said surface of the valve it will overcome the constantly-acting pressure on the smaller area of the valve and the latter will be moved at the wrong time and cushion the blow of the piston if the latter is on its forward stroke or shorten the stroke if the piston is moving rearwardly. In some tools of this class it has been sought to avoid this difficulty by providing an exhaust port or ports located near the forward end of the piston-chamber and admit the motive fluid to the forward side of the piston for a small part of its rearward stroke and depend on the momentum of the piston to carry it to the rear end of the piston-chamber; but since in order to cut off the supply of fluid to the forward side of the piston the valve is shifted to admit the motive fluid to the rear end of the piston it results that the latter will travel rearwardly but a comparatively short distance after the motive fluid is admitted to the rear end of the piston-chamber. By providing a passage from the larger area of the valve to the piston-chamber, which is always open to the latter, except when the piston is near one end of its stroke, the motive fluid that may escape past the piston or between the joints of the valve-block and cylinder or between the latter and the outer jacket to the passage leading to the large area of the valve is prevented from creating a pressure on the latter when the piston is traveling in a predetermined direction, and I am enabled to overcome a serious objection to the practical operation of tools of this character. I prefer to provide a passage leading from the larger area of the valve to the piston-chamber with an auxiliary port in addition to the admission-port by which the motive fluid is admitted to the large area of the valve; but it will be understood that a separate passage for each of said ports leading from the larger area of the valve to the piston-chamber may be employed instead of a single passage having two ports. The term "auxiliary port" is employed herein and in the claims to designate a port by means of which an additional amount of motive fluid is supplied to the valve or which provides additional means for exhausting the fluid from the larger area of the valve.

Another feature of my invention relates to a novel form of throttle-valve for controlling the initial admission of motive fluid to the tool. Said valve is provided with a grasping-handle removably secured to the stem of the valve, said handle and stem in the present instance having a passage through which the motive fluid is supplied to the throttle-valve; but I no not limit myself to the means by which the motive fluid is conducted to the throttle-valve. The stem of the throttle-valve is preferably integral with the latter, but such a construction is not essential to the broader scope of my invention, as will be apparent from the description hereinafter given and from the terms of my respective claims. The throttle - valve is of conical shape, the smaller end facing toward the rear end of the tool, and is provided with a rearwardly-projecting stem of smaller diameter, said stem having a grasping-handle removably secured thereto for holding the tool to the work. A stuffing-box engages the stem and can be adjusted to prevent the motive fluid from escaping from around the rear end of the stem, and means is provided for normally holding the throttle-valve in a rearwardly or seated position to cut off the supply of fluid to the tool. Said means also serves to hold the throttle - valve in engagement with the stem when the latter is not integral therewith. In tools of this class as ordinarily constructed the throttle-valve fits plug-like into its socket or seat and there is no means for taking up the wear between the valve and its seat. When the valve becomes slightly worn, the motive fluid escapes past the bearing-surfaces of the valve to the tool and around the rear end of the valve to the atmosphere. With my novel form of throttle-valve there is practically no sliding movement of the valve on its seat and any wear that may occur is automatically taken up by the longitudinal movement of the valve with relation to its seat and the body of the tool. The valve itself froms a stop for the rearward movement of the latter and no other means are required to prevent rearward displacement of the valve with relation to the body of the tool. When the throttle-valve is held in its forward or unseated position by means of its stem and the grasping-handle, the body of the tool may be rotated with relation to said valve without causing any wear between the face of the latter and its seat, since the valve is not at such time in contact with its seat. When tools of this character are employed for drilling holes in stone or for other purposes where it is essential that the working tool be rotated with relation to the work, said working tool may be engaged by the body of the tool and the latter be rotated with relation to the throttle-valve, grasping-handle, and source of fluid-pressure supply to rotate the working tool. My novel throttle-valve is especially well adapted for a tool wherein the working tool is rotated by rotating the body of the tool with relation to said valve and the source of fluid-pressure supply; but this feature is not essential and other means for rotating the working tool may be employed.

My invention further consists of novel details of construction, all as will be hereinafter more fully described, and pointed out in the claims.

In the drawings, Figure 1 is a longitudinal central section of a pneumatic impact-tool illustrating the invention, showing the valve and hammer in their forward position. Fig. 2 is a central section on line 2 2 of Fig. 4. Fig. 3 is a section through the valve and valve-lock, taken on the same line as Fig. 1, showing the valve in its rearward position. Fig. 4 is a cross-section on line 4 4 of Fig. 1. Fig. 5 is a cross-section on line 5 5 of Fig. 1. Fig. 6 is a cross-section on line 6 6 of Fig. 1. Fig. 7 is a cross-section on line 7 7 of Fig. 1. Fig. 8 is a cross-section on line 8 8 of Fig. 1. Fig. 9 is a cross-section on line 9 9 of Fig. 1.

The tool comprises a cylinder B; an outer casing B'; a piston (or hammer) G, which moves in said cylinder; a valve-block I at the upper or rear end of the cylinder and formed with a chamber I'; a valve J, located and moving in said chamber; an upper head or plate H for the cylinder; a grasping-handle O, removably connected to a stem N', that projects from a throttle-valve N, said handle and stem having a passage connecting with the source of fluid-pressure which operates the tool; a forward head C, which receives the drill or working tool, and a turning-handle F, secured to the cylinder and forward head for the purpose of rotating the working tool; a retaining-head M, having a flange which is engaged by an internal shoulder of a member or sleeve K, which is in threaded engagement with the cylinder; a split clamp L, which is adapted to grip the cylinder and sleeve; a stuffing-box P in threaded engagement with the retaining-head, and a jam-nut Q to prevent the stuffing-box from unscrewing.

The throttle-valve N is mounted in the retaining-head M in such manner as to be movable both longitudinally and rotatably. The retaining-head M is provided with a longitudinal bore of different diameters, the larger bore being at the forward end and formed with a tapering seat. A port 10 opens through said seat and registers with an inlet-port 11 in the valve-block. The stem N' may be made integral with the throttle-valve N, as shown in Fig. 1, or it may be separate therefrom, as shown in Fig. 2. In the latter case the stem is formed with a shoulder 12, which prevents entire withdrawal of the stem from the head. A spring 13 normally holds the throttle-valve to its seat, and when the stem N' is not integral with the valve the spring holds the valve in engagement with the stem, and when the latter is pushed forward by means of the grasping-handle the valve is held away from its seat. A recess 14 is formed in the forward end of the throttle-valve, and the spring 13, seated in said recess and bearing against a plug or cover 15, which closes the forward end of the bore of the retaining-head, normally retains the valve N, stem N', and grasping-handle O in a rearward position with relation to the head, as shown in Fig. 1. The stem N', throttle-valve N, and spring 13 are inserted into the bore of the head M from the forward end, and said end of the bore is closed by the plug 15, which fits tightly therein, whereby said parts are held in assembled position and retained in the head. A passage 16 is formed in the handle O, extending longitudinally through one arm and registering with a passage 17, extending down into the forward end of the stem. The outer portion of the passage in the handle is screw-threaded or otherwise adapted for connection with a source of fluid-pressure supply. (Not shown.) A series of holes 18 are formed through the wall of the stem at the forward end, through which the motive fluid will pass into the larger bore of the head when the stem is in a forward position. A port 10 and passage 19 leads from said larger bore in the head and extends down inside of the wall of the head and through the forward end and registers with an inlet passage 11 and port 20 in the valve-block I. When the grasping-handle is pushed forward, the throttle-valve will also be moved forward and the port 10 will be uncovered, thus leaving a free passage for the motive fluid from the passage 17 in the handle through the holes 18 in the stem and passage 19 in the head to the inlet-passage 11 and port 20 in the valve-block.

The valve J consists of a tubular shell of different diameters provided with an annular groove 21, formed between the large and small diameters, said groove being always open to the inlet-port 20 in whatever position the valve may be, and since the annular shoulder 22 on one side of the groove is of greater area than the shoulder 23 on the other side of the groove the motive fluid always tends to press the valve in a forward direction. The valve is provided with an annular groove 24 at its large diameter, which is open to the interior by a series of holes 25. Said valve, as shown in Fig. 2, is provided with a small projecting end 26, which fits into a bore in the plate or head H, the end of said bore forming a stop for the forward movement of the valve. There is a small hole 27 through the stem 26, so that both ends of the valve are connected with the interior, and the motive fluid which is admitted to the forward end of the valve-chamber to move the valve rearwardly, as will be hereinafter described, acts on the annular shoulder between the large diameter of the valve and the small projecting end. I prefer to close the valve at the large end and provide the same with a slight projection of small diameter, which permits the motive fluid to act against substantially the whole area of the forward end of the valve to shift the latter when the fluid is admitted thereto when the valve is held against the plate H by the constantly-acting pressure on the differential surfaces of the annular groove 21, as shown in Fig. 1. The valves shown in Figs. 1 and 2 are substantially the same, the only difference being that the valve shown in Fig. 1 has a solid projecting end that is shorter than the tubular end of the valve shown in Fig. 2. A passage 28 in the valve-block is provided with a port 29, opening into the valve-chamber. Said passage registers with a passage 30 in the plate H, which registers with a passage 31 in the wall of the cylinder, said passage 31 having a port 32 opening into the rear end of the piston-chamber. A passage 33 in the valve-block is provided with the ports 34 and 35, opening into the valve-chamber. Said passage 33 registers with a passage 36 in the plate H, which registers with a passage 37 in the wall of the cylinder, having a port 38 opening into the forward end of the piston-chamber. When the valve J is in the forward position, as shown in Fig. 1, the motive fluid will pass from the annular groove 21 through the port 29, passages 28 30 31, and port 32 to the rear end of the piston-chamber. The exhaust from the forward end of the piston-chamber will pass through the port 38, passages 37, 36, and 33, and the greater part of the exhaust will pass through the port 35 in the valve-block, which is of greater capacity than the port 34, through which the motive fluid is supplied to the forward end of the piston-chamber, as will be hereinafter described. The plug 15 is provided with a port 39 in alinement with the bore 40 of the valve. Said port 39 is connected by a passage 41 in the plug and head with a channel 42 in the side of the valve-block, which opens into an annular groove 43 in the outside of the valve-block. The groove 43 is open to the atmosphere through the port 44 in the sleeve K, as shown in Fig. 2, whereby the interior of the valve is always open to the atmosphere. The exhaust from the forward end of the piston-chamber that passes through the port 35 enters the groove 24 in the valve and passes to the interior thereof through the holes 25. The exhaust that passes through the port 34 passes by the rear end of the valve and with the exhaust from the interior of the valve passes to the atmosphere through the port 39 in the plug, passage 41, channel 42, groove 43, and port 44. When the valve is in its rearward position, the port 34 will be open to the groove 21 in the valve and the motive fluid will pass by the connecting-passages before mentioned to the forward end of the piston-chamber to drive the piston rearwardly. The exhaust from the rear end of the piston-chamber will pass through the port 32, passages 31, 30, and 28, and port 29 to the groove 24 in the valve, which registers with said port 29 when the valve is in its rearward position, the exhaust passing through the holes 25 to the interior of the valve and to the atmosphere by the same ports and passages as described in connection with the exhaust from the forward end of the piston, since the interior of the valve is always open by means of said ports and passages to the atmosphere. The port 34 in the valve-block is made of sufficient capacity to drive the piston rearwardly at the required speed when the valve is in its rearward position and serves as an exhaust-port when the valve is in its forward position; but since it is desirable to limit the amount of motive fluid admitted to drive the piston rearwardly the port 35 is made of considerably greater capacity and provides additional means for exhausting the fluid from the forward side of the piston and also provides additional means for quickly relieving the pressure from the forward end of the valve when the piston approaches the end of its rearward stroke, as will be hereinafter described. A passage 45 in the valve-block is provided with a port 46, which is always open to the groove 21 in the valve, as shown in Fig. 2. Said passage 45 registers with a passage 47 in the plate H, which registers with a passage 48 in the wall of the cylinder, having a port 49 opening into the piston-chamber. A passage 50 in the wall of the cylinder leads from the forward end of the valve-chamber through the plate H to near the forward end of the piston-chamber and is provided with the ports 51 52, opening into the piston-chamber. An exhaust-port 53 opens through the wall of the cylinder and jacket to the atmosphere. The piston is provided with an annular groove 54 near its rear end, and when the piston is near the end of its forward stroke the groove 54 connects the live-fluid passage 48 with the passage 50, leading to the large area of the valve, and the motive fluid acting on said large area of the valve overcomes the constantly-acting pressure on the differential-pressure surfaces of the groove 21 to move the valve to its rearward position. The retaining-head M is provided with a small port 55, connecting the passage 19 with the bore in the head forward of the front end of the throttle-valve, so that when said valve is away from its seat the motive fluid will act against the forward end of said valve to balance the pressure of the fluid on the rear end of the latter to allow the spring 13 to seat the valve. When the throttle-valve is seated, the pressure on the front end is relieved through the port 55 and the connected passages, so that it is only necessary to overcome the spring-pressure to move said valve forward. Although I have shown the throttle-valve seated by spring-pressure, it will be understood that the spring 13 may be omitted and the valve be seated by the fluid-pressure. By omitting the port 55 and connecting the recess 14 of the valve with the passage 17 in the stem the motive fluid will constantly act to press the valve in a rearward direction; but since the throttle-valve must be of quite large diameter in the present instance in order to allow for a passage of sufficient capacity through the stem with high fluid-pressures it may require quite an effort on the part of the operator to start the valve from its seat; but after the valve is unseated it is practically balanced. The head M is provided with the stuffing-box P, which can be adjusted to provide for wear of the stem N' in the bore of the head, and thereby prevent the escape of the motive fluid between the stem and the bore of the head. The jam-nut Q serves to prevent the stuffing-box from unscrewing and to hold the latter in adjusted position on the head. The threaded sleeve K serves to hold the plate H, valve-block I, and the retaining-head M in assembled position with relation to the cylinder. The split clamp L is provided with a bolt which passes freely through one lug and is in threaded engagement with the other lug. Said bolt is provided with a jam-nut to prevent unscrewing of the bolt. The clamp has a bore of different diameters, one diameter being adapted to grip the cylinder and the other diameter to grip the sleeve to prevent the latter from turning with relation to the cylinder when in assembled position.

The forward cylinder-head C has a bore of different diameters, the bore of largest diameter having a bushing D, fitting tightly therein, said bushing having an opening 56 of non-circular cross-section to receive the non-circular shank of the working tool. A striker E is movably mounted in the bore of the head and provided with a rearwardly-projecting stem extending into the cylinder. The striker is provided with a series of longitudinal grooves 57, which are adapted to prevent the motive fluid that may leak past the smaller diameter of the striker in the bore of the head from exerting a pressure on the annular shoulder 58 of the striker. The head is provided with a port 59, opening into the bore between the rear end of the bushing D and the forward end of the striker. The fluid leaking past the stem of the striker will pass through the grooves 57 and out through the port 59, thereby preventing an accumulation of pressure to act on the annular shoulder 58 of the striker, which would tend to push the striker forward, thus moving the tool backward with relation to the working tool, so that the latter would not be retained in its proper position with relation to the stroke of the piston. A split clamp F grips the head and cylinder and is provided with a handle F' for rotating the tool with relation to the grasping-handle and source of fluid-pressure supply, thereby rotating the working tool with relation to the work.

I desire to lay especial emphasis on the advantages of my novel form of throttle-valve when employed in an impact-tool which is rotated with relation to the source of fluid-pressure supply. Since the valve is not in contact with its seat when the tool is in operation, there is practically no wear on the seat of the valve, and if there should be any wear between the valve and its seat it is automatically taken up by the longitudinal movement of the valve with relation to the head by the pressure of the spring.

The operation is as follows: When the tool is pressed to the work by means of the grasping-handle, the stem N' pushes the throttle-valve from its seat and the motive fluid will pass through the passage 19 in the head and the passage 11 in the valve-block into the annular groove 21 in the valve, thence through the port 46 and passages 45, 47, and 48 and port 49 into the groove 54 in the piston when the latter is in the position shown in Fig. 1. The port 52 being also open to the groove in the piston when the latter is at or near the end of its forward stroke, the motive fluid will pass through the passage 50 to the forward end of the valve-chamber and acting on the large area of the valve will overcome the constantly-acting pressure on the smaller area and move the valve to its rearward position. The port 34 being open to the groove 21 in the valve, the motive fluid will pass through passages 33 36 37 to the forward end of the piston-chamber and drive the piston rearwardly. When the valve is in its rearward position, the port 35 is open to the valve-chamber forward of the front end of the valve, as shown in Fig. 3, and when the piston on its rearward stroke uncovers the exhaust-port 53 the motive fluid that was acting on the large area of the valve to maintain the latter in position will pass through the port 35 and passages 33 36 37 to the forward end of the piston-chamber and escape to the atmosphere through the port 53. The cross-sectional area of the port 34 is small compared to the cross-sectional area of the port 35, passages 33 36 37, and port 53, so that although the port 53 is opened while the motive fluid is being supplied to the piston-chamber through the port 34 the pressure on the large area of the valve is quickly reduced to allow the constantly-acting pressure on the valve to move the latter to its forward position. When the piston has moved a short distance on its rearward stroke, it closes the port 52 and immediately opens the auxiliary port 51, whereby the motive fluid that is moving the piston rearwardly will maintain a pressure on the large area of the valve until the port 53 is opened by the piston, and then the passage 50 and the port 51 serve as additional means for conducting the fluid from the large area of the valve to the piston-chamber, the latter being open to the atmosphere through said port 53. The exhaust from the rear end of the piston-chamber passes through the passages 31 30 28 to the groove 24 of the valve and to the interior of the latter, which is always open to the atmosphere by means of the ports and passages hereinbefore described. When the valve is moved to its forward position, as described, the passages 28 30 31, leading to the rear of the piston-chamber, will be open to the groove 21 in the valve and the motive fluid will be admitted in the rear of the piston to drive the latter forward. When the piston moves forward a short distance, it closes the exhaust-port 53, and the fluid in front of the piston then passes through the passages 37 36 33 to the ports 35 34, the greater part passing through the port 35 to the interior of the valve, and the other part passes through the port 34 past the end of the valve. The port 51 being open to the piston-chamber during the greater part of the forward stroke of the piston, there can be no accumulation of fluid-pressure against the larger area of the valve until the port 51 is closed by the piston as it approaches the end of its stroke. Said port is closed by the forward end of the piston slightly before the port 52 is connected by the groove 54 in the piston with the live-fluid passage 48, whereby the motive fluid admitted to the passage 50 to shift the valve is prevented from escaping through the passage 37 to the exhaust.

I claim as my invention—

1. In a fluid-controlled impact-tool, a piston-chamber and piston, a tubular valve for controlling the movements of the piston, means controlled by said piston for actuating said valve, a valve-block for the valve having a bore of two diameters in alinement with the piston-chamber and a port opening into the inner end of the larger diameter of the bore, a retaining-head for the valve-block adapted to limit the travel of the valve in the direction of said head to prevent the valve closing said port, and a port in the forward end of the retaining-head in alinement with the bore of the valve-block which is always open to the interior of the valve.

2. In a fluid-controlled impact-tool, a piston-chamber and piston, a valve-block having a bore of two diameters in alinement with the piston-chamber and a port opening into the inner end of the larger diameter of the bore, a tubular valve in the valve-block provided with opposing pressure-surfaces of different areas to which the motive fluid is admitted to move the valve in opposite directions, a retaining-head for the valve-block adapted to limit the travel of the valve in the direction of said head to prevent the valve closing said port, and a port in the forward end of the retaining-head in alinement with the bore of the valve-block which is always open to the interior of the valve.

3. In a fluid-controlled impact-tool, a piston-chamber and piston, a valve-block having a bore of two diameters in alinement with the piston-chamber, the smaller diameter being at the rear end of said block and a port opening into the inner end of the larger diameter of the bore, a tubular valve in the valve-block for controlling the movements of the piston, means controlled by the piston for actuating said valve, a retaining-head for the valve-block adapted to limit the travel of the valve in a rearward direction to prevent the valve closing the said port, and a port in the forward end of the retaining-head in alinement with the bore of the valve-block which is always open to the interior of the valve.

4. In a fluid-controlled impact-tool, a piston-chamber and piston, a valve-block having a bore of two diameters in alinement with the piston-chamber, the smaller diameter being at the rear end of said block and a port opening into the inner end of the larger diameter of the bore, a tubular valve in the valve-block for controlling the movements of the piston, having diameters corresponding to the bore of the valve-block and an annular groove between the large and small diameters, means controlled by the piston for actuating said valve, a retaining-head for the valve-block adapted to limit the travel of the valve in a rearward direction whereby said port in the valve-block is always open to said annular groove in the valve, a port in the forward end of the retaining-head in alinement with the bore of the valve-block which is always open to the interior of the valve.

5. In a fluid-controlled impact-tool, a piston-chamber and piston, a valve-block having a bore of two diameters in alinement with the piston-chamber, a tubular valve for controlling the movements of the piston, means controlled by the piston for actuating the valve, said valve having an exterior annular groove open to the interior of the valve, a port in said valve-block connected by a passage to one end of the piston-chamber and adapted to register with said groove in the valve when the latter is at the end of its movement in one direction, a passage leading from the opposite end of the piston-chamber provided with two ports, one of said ports opening into the smaller bore of the valve-block, the other of said ports opening into the larger bore of the block and adapted to register with said annular groove in the valve when the latter is at the end of its movement in an opposite direction, a retaining-head for the valve-block having a port in alinement with the bore of said block whereby said last-mentioned port is alternately placed in communication through said groove in the valve with opposite ends of the piston-chamber.

6. In a fluid-controlled impact-tool, a piston-chamber and piston, a valve-block having a bore of two diameters in alinement with the piston-chamber, a tubular valve for controlling the movements of the piston, means controlled by the piston for actuating the valve, said valve having an exterior annular groove open to the interior of the valve, a port in said valve-block connected by a passage to one end of the piston-chamber and adapted to register with said groove in the valve when the latter is in its rearward position, a passage leading from the opposite end of the piston-chamber provided with two ports, one of said ports opening into the smaller bore of the valve-block, the other port opening into the larger bore and adapted to register with said groove in the valve when the latter is in its forward position, a retaining-head for the valve-block having a port in alinement with the bore of said block whereby the opposite ends of the piston-chamber are alternately placed in communication through said groove in the valve with said last-mentioned port.

7. In a fluid-controlled impact-tool, a piston-chamber and piston, a valve-block having a bore of two diameters in alinement with the piston-chamber, a tubular valve for controlling the movements of the piston, means controlled by the piston for actuating the valve, said valve having an exterior annular groove open to the interior of the valve, a port in said valve-block connected by a passage to one end of the piston-chamber and adapted to register with said groove in the valve when the latter is in its rearward position, a passage leading from the opposite end of the piston-chamber provided with two ports, one of said ports opening into the smaller bore of the valve-block, the other port opening into the larger bore and adapted to register with said groove in the valve when the latter is in its forward position, and open to the bore of the valve-block forward of said valve when the latter is in its rearward position.

8. In a fluid-controlled impact-tool, a piston-chamber and piston, a valve-block having a bore of two diameters in alinement with the piston-chamber, a tubular valve for controlling the movements of the piston having opposing pressure-surfaces of different areas to which the motive fluid is admitted to move the valve in opposite directions, means controlled by the piston for actuating the valve, said valve being provided with an exterior annular groove located between the large and small diameters, a port in said valve-block connected by a passage to one end of the piston-chamber and adapted to register with said annular groove in the valve when the latter is at the end of its movement in one direction, a passage leading from the opposite end of the piston-chamber provided with two ports opening into the valve-block, one of said last-mentioned ports being adapted to register with said annular groove in the valve when the latter is at the end of its movement in an opposite direction and the other of said last-mentioned ports being open to the larger area of the valve when the latter is in said last-mentioned position.

9. In a fluid-controlled impact-tool, a piston-chamber and piston, a valve-block having a bore of two diameters in alinement with the piston-chamber, a tubular valve for controlling the movements of the piston having opposing pressure-surfaces of different areas to which the motive fluid is admitted to move the valve in opposite directions, means controlled by the piston for actuating the valve, a passage leading from one end of the piston-chamber provided with two ports controlled by said valve, one of said ports opening into the smaller and the other opening into the larger bore of said valve-block, the latter port being adapted to admit the motive fluid from said passage to the larger area of the valve when it is in one position, said port being opened by the valve to exhaust the motive fluid from said passage when said valve is in an opposite position.

10. In a fluid-controlled impact-tool, a piston-chamber and piston, a valve-block having a bore of two diameters in alinement with the piston-chamber, a tubular valve for controlling the movements of the piston having opposing pressure-surfaces of different areas to which the motive fluid is admitted to move the valve in opposite directions, means controlled by the piston for actuating the valve, a passage leading from one end of the piston-chamber provided with one port opening into the smaller and another port opening to the larger bore of the said valve-block, said ports being controlled by the valve; the first-mentioned port being opened to admit motive fluid through the said passage to the said end of the piston-chamber, and the other port being opened to admit the motive fluid from the said passage to the larger area of the valve when the valve is at one end of its stroke.

11. In a fluid-controlled impact-tool, a piston-chamber and piston, a valve-block having a valve-chamber of two diameters in alinement with the piston-chamber, a tubular valve located therein provided with opposing pressure-surfaces of different areas to which the motive fluid is admitted to move the valve in opposite directions, a port in the valve-block which is always open to the larger diameter of the valve-chamber, a head or plate located between the piston-chamber and valve-chamber to close respectively the rearward and forward ends of said chambers, a retaining-head forming the rear wall of the valve-chamber and adapted to limit the travel of the valve, said head being provided with a port in alinement with the valve and always open to the interior of the latter.

12. In a fluid-controlled impact-tool, a piston-chamber and piston, a valve for controlling the movements of the piston provided with opposing pressure-surfaces of different areas to which the motive fluid is admitted to shift the valve, and against the smaller of which areas the motive fluid constantly acts to press the valve in one direction, a passage controlled by the piston and opened by the latter when it approaches one end of its stroke to admit motive fluid to the larger pressure-surface of the valve and shift the valve, said passage being opened by the piston on its opposite stroke to admit an additional amount of motive fluid to said pressure-surface of the valve to retain the valve in said position, until the piston approaches the end of said last-mentioned stroke.

13. In a fluid-controlled impact-tool, a piston-chamber and piston, a valve for controlling the movements of the piston provided with opposing pressure-surfaces of different areas to which the motive fluid is admitted to shift the valve, and against the smaller of which areas the motive fluid constantly acts to press the valve in one direction, a passage controlled by the piston and opened by the latter when it approaches the forward end of its stroke to admit motive fluid to the larger pressure-surface of the valve to shift the valve, said passage being opened by the piston on its rearward stroke to admit an additional amount of motive fluid to said pressure-surface of the valve to retain the valve in said position until the piston approaches the end of said last-mentioned stroke.

14. In a fluid-controlled impact-tool, a piston-chamber and piston, a valve for controlling the movements of the piston provided with opposing pressure-surfaces of different areas to which the motive fluid is admitted to move the valve in opposite directions, and against the smaller of which areas the motive fluid constantly acts to press the valve forward, a passage controlled and opened by the piston when it approaches one end of its stroke to admit motive fluid to the larger pressure area of the valve to move the valve rearward, said passage being opened by the piston on its opposite stroke to admit an additional amount of fluid to said larger area of the valve to retain the valve in position until the piston approaches the end of said last-mentioned stroke.

15. In a fluid-controlled impact-tool, a piston-chamber and piston, a valve for controlling the movements of the piston provided with opposing pressure-surfaces of different areas to which the motive fluid is admitted to move the valve in opposite directions, and against the smaller of which areas the motive fluid constantly acts to press the valve in one direction, a passage controlled and opened by the piston when it approaches one end of its stroke to admit motive fluid to the larger pressure area of the valve to move the valve, said passage being opened by the piston on its opposite stroke to admit an additional amount of motive fluid to the larger area of the valve, and an exhaust-port opened by the piston when it approaches the end of said last-mentioned stroke to exhaust the motive fluid from said larger area of the valve.

16. In a fluid-controlled impact-tool, a piston-chamber and piston, a valve for controlling the movements of the piston provided with opposing pressure-surfaces of different areas to which the motive fluid is admitted to move the valve in opposite directions and against the smaller of which the motive fluid constantly acts to press the valve forward, a passage leading from the larger area of the valve to the piston-chamber controlled by the piston and opened by the latter near the end of its forward stroke to admit motive fluid to the larger area of the valve to move the valve rearward, said passage being opened by the piston on its rearward stroke to admit an additional amount of fluid to the larger area of the valve, an exhaust-port opened by the piston near the end of its rearward stroke to reduce the pressure on the larger area of the valve to allow the constantly-acting pressure on the smaller area of the valve to move the valve forward, said valve when moved forward opening a passage leading from the forward end of the piston-chamber to allow the motive fluid to escape from said end of the piston-chamber and from the larger area of the valve.

17. In a fluid-controlled impact-tool, a piston-chamber and piston, a valve for controlling the movements of the piston provided with opposing pressure-surfaces of different areas to which the motive fluid is admitted to move the valve in opposite directions, means controlled by the piston for actuating said valve, passages leading from said valve to opposite ends of the piston-chamber to alternately admit and exhaust the motive fluid to and from said ends of the piston-chamber, a passage leading from the larger area of the valve to the piston-chamber, said passage being always open to one end of the piston-chamber except when the piston is near one end of its stroke whereby the motive fluid is alternately admitted to and exhausted from the larger area of the valve during the intermediate travel of the piston in opposite directions.

18. In a fluid-controlled impact-tool, a piston-chamber and piston, a valve for controlling the movements of the piston provided with opposing pressure-surfaces of different areas to which the motive fluid is admitted to move the valve in opposite directions, a passage leading to one end of the piston-chamber and controlled by said valve to alternately admit and exhaust motive fluid to and from said end of the piston-chamber, a passage leading from the larger area of the valve to said end of the piston-chamber whereby motive fluid is admitted to and exhausted from the large area of the valve through the piston-chamber, said last-mentioned passage being closed to the piston-chamber by the piston when the piston is near said end of the piston-chamber, a live-fluid passage leading from the source of supply to the piston-chamber and opened by the piston to said passage leading to the larger area of the valve to shift the valve when the piston is at said end of the piston-chamber.

19. In a fluid-controlled impact-tool, a piston-chamber and piston, a valve-block having a valve therein for controlling the movements of the piston, a retaining-head for the valve-block having a bore of different diameters in alinement with the piston-chamber, the larger diameter being at the forward end of the head and forming an internal shoulder near said forward end, a throttle-valve located in the larger bore of the head and provided with a rearwardly-projecting stem of smaller diameter, said throttle-valve being adapted to be seated against said shoulder when in a rearward position and means for normally holding said throttle-valve in seated position.

20. In a fluid-controlled impact-tool, a piston-chamber and piston, a valve-block having a valve therein for controlling the movements of the piston, a retaining-head for the valve-block having a bore of different diameters in alinement with the piston-chamber, the larger diameter being at the forward end of the head and forming an internal shoulder near said forward end, a throttle-valve for controlling the initial admission of motive fluid to the tool, said throttle-valve being located in the larger bore of the head and adapted to be seated against said shoulder when in a rearward position, means for normally holding the throttle-valve in seated position, a stem located in the smaller bore of the head and engaging said throttle-valve, a grasping-handle for holding the tool to the work and adapted to hold said throttle-valve in an unseated position when the tool is held to the work.

21. In a fluid-controlled impact-tool, a piston-chamber and piston, a valve-block having a valve therein for controlling the movements of the piston, a retaining-head for the valve-block having a bore of different diameters in alinement with the piston-chamber, the larger diameter being at the forward end of the head and forming an internal shoulder near said forward end, a throttle-valve for controlling the initial admission of motive fluid to the tool, said throttle-valve being located in the larger bore of the head and adapted to be seated against said shoulder when in a rearward position, means for normally holding the throttle-valve in seated position, a stem located in the smaller bore of said head, means to retain said stem in the head, a grasping-handle secured to said stem and adapted for holding the tool to the work, said grasping-handle and stem being adapted to hold said throttle-valve in an unseated position when the tool is held to the work.

22. In a fluid-controlled impact-tool, a piston-chamber and piston, a valve-block having a valve therein for controlling the movements of the piston, a retaining-head for the valve-block having a bore of different diameters in alinement with the piston-chamber, the larger diameter being at the forward end of the head and forming an internal shoulder near said forward end, a throttle-valve for controlling the initial admission of motive fluid to the tool, said throttle-valve being located in the larger bore of the head and adapted to be seated against said shoulder when in a rearward position, means for normally holding the throttle-valve in seated position, said throttle-valve being provided with a rearwardly-projecting stem of smaller diameter corresponding to the bore at the rear end of said head and means for closing the forward end of the larger bore after the throttle-valve and stem are placed in position therein.

23. In a fluid-controlled impact-tool, a piston-chamber and piston, a valve-block having a valve therein for controlling the movements of the piston, a retaining-head for the valve-block having a bore of different diameters in alinement with the piston-chamber, the smaller diameter being at the rear end of the head, said head having an internal shoulder near the forward end, a throttle-valve provided with a rearwardly-projecting stem of smaller diameter corresponding to the bore at the rear end of the head, said throttle-valve being adapted to be seated against said shoulder when in a rearward position, means for normally holding the throttle-valve in seated position, a grasping-handle secured to the stem for holding the tool to the work, said handle and stem being adapted to hold said throttle-valve in an unseated position when the tool is pressed to the work.

24. In a fluid-controlled impact-tool, a cylinder and piston, a valve-block having a controlling-valve therein, a retaining-head for the valve-block having a longitudinal bore of different diameters, the smaller diameter being at the rear end of the head, a throttle-valve located in the larger bore and provided with a rearwardly-projecting stem of smaller diameter corresponding to the bore in the head and rotatably mounted therein, means for holding said cylinder, valve-block and retaining-head in assembled position, and means whereby said cylinder may be rotated with relation to said stem and throttle-valve.

25. In a fluid-controlled impact-tool, a cylinder and piston, a valve-block having a controlling-valve therein, a retaining-head for the valve-block having a longitudinal bore of different diameters, the smaller diameter being at the rear end of the head, a throttle-valve located in the larger bore and provided with a rearwardly-projecting stem of smaller diameter, the throttle-valve being adapted to be seated in the head when in a rearward position, said throttle-valve and stem being longitudinally and rotatably mounted in the bore of the head, means for holding said cylinder, valve-block and retaining-head in assembled position, and means whereby said cylinder may be rotated with relation to said stem and throttle-valve.

26. In a fluid-controlled impact-tool, a cylinder and piston, a valve-block having a controlling-valve therein, a retaining-head for the valve-block having a longitudinal bore of different diameters, the smaller diameter being at the rear end of the head, a throttle-valve located in the larger bore and provided with a rearwardly-projecting stem of smaller diameter, the throttle-valve being adapted to be seated in the head when in a rearward position, said throttle-valve and stem being longitudinally and rotatably mounted in the bore of the head, a grasping-handle secured to said stem and adapted for holding the tool to the work, said grasping-handle and stem being adapted to hold the throttle-valve in an unseated position when the tool is pressed to the work, means for holding said cylinder, valve-block and retaining-head in assembled position and means whereby said cylinder may be rotated with relation to said grasping-handle and throttle-valve.

27. In a fluid-controlled impact-tool, a piston-chamber and piston, a valve-block having a valve therein for controlling the movements of the piston, a retaining-head for the valve-block having a bore of different diameters in alinement with the piston-chamber, the larger diameter being at the forward end of the head, a throttle-valve located in the larger bore of the head and provided with a rearwardly-projecting stem having a passage therein through which the motive fluid is supplied to the tool, said throttle-valve being adapted to be seated in the head when in a rearward position, means for normally holding the throttle-valve in seated position, a grasping-handle secured to said stem and adapted for holding the tool to the work, a passage in said handle communicating with said passage in the stem and adapted to be connected to a source of fluid-pressure supply, said grasping-handle and stem being adapted to hold the throttle-valve in an unseated position when the tool is held to the work.

28. In a fluid-controlled impact-tool, a cylinder and piston, a valve-block having a controlling-valve therein, a retaining-head for the valve-block having a longitudinal bore of different diameters, the smaller diameter being at the rear end of the head, a throttle-valve located in the larger bore and provided with a rearwardly-projecting stem of smaller diameter corresponding to the bore at the rear of the head and rotatably mounted therein, a passage in said stem through which the motive fluid is supplied to the tool, a grasping-handle secured to said stem having a passage communicating with said passage in the stem and adapted to be connected to a source of fluid-pressure supply, means for holding said cylinder, valve-block and retaining-head in assembled position, and means whereby said cylinder may be rotated with relation to said grasping-handle and source of fluid-pressure supply.

29. In a fluid-controlled impact-tool, a piston-chamber and piston, a valve for controlling the movements of said piston, means controlled by said piston for actuating said valve, a valve-block having a port therein controlled by said valve and connected by a passage to one end of the piston-chamber to admit and exhaust the motive fluid to and from one side of the piston, a passage leading from the opposite end of the piston-chamber and provided with two ports opening into the valve-block, one of said ports being controlled by said valve to admit and exhaust the motive fluid to and from said last-mentioned end of the piston-chamber and the other of said ports being controlled by said valve to provide additional means for exhausting the fluid from said end of the piston-chamber.

30. In a fluid-controlled impact-tool, a piston-chamber and piston, a valve for controlling the movements of said piston, means controlled by said piston for actuating said valve, a valve-block having ports and passages in proximity to the forward and rear ends respectively and connected with opposite ends of the piston-chamber and controlled by said valve to alternately admit and exhaust the motive fluid to and from the respective ends of the piston-chamber, said valve-block being provided with an auxiliary port which is controlled by said valve to provide additional means for exhausting the fluid from one end of the piston-chamber.

31. In a fluid-controlled impact-tool, a piston-chamber and piston, a valve for controlling the movements of said piston, means controlled by said piston for actuating said valve, a valve-block having ports and passages in proximity to the forward and rear ends respectively and connected with opposite ends of the piston-chamber and controlled by said valve to alternately admit and exhaust the motive fluid to and from the respective ends of the piston-chamber, an auxiliary port controlled by said valve and connected with the passage leading to the forward end of the piston-chamber, said auxiliary port being of greater capacity than the port through which the motive fluid is supplied to said passage leading to said end of the piston-chamber, whereby additional means of greater capacity is provided for exhausting the fluid from said forward end of the piston-chamber.

32. In a fluid-controlled impact-tool, a piston-chamber and piston, a valve for controlling the movements of said piston, means controlled by said piston for actuating said valve, a valve-block having a port connected with a passage leading to the rear end of the piston-chamber and a port connected with a passage leading to the forward end of the piston-chamber, said ports being controlled by said valve to alternately admit and exhaust the motive fluid to and from the respective ends of the piston-chamber, an auxiliary port connected with the passage leading to said forward end of the piston-chamber and opened by said valve when the latter is moved in one direction to allow part of the fluid from the forward end of the piston-chamber to exhaust through said auxiliary port.

33. In a fluid-controlled impact-tool, a piston-chamber and piston, a valve for controlling the movements of said piston, means controlled by said piston for actuating said valve, a valve-block having a port connected with a passage leading to the rear end of the piston-chamber and a port connected with a passage leading to the forward end of the piston-chamber, said ports being controlled by said valve to alternately admit and exhaust the motive fluid to and from the respective ends of the piston-chamber, an auxiliary port connected with the passage leading to said forward end of the piston-chamber and opened by said valve when the latter is moved in one direction to admit an additional supply of air to the forward end of said valve and when moved in the opposite direction to allow part of the fluid from the forward end of the valve-chamber to exhaust through said auxiliary port.

34. In a fluid-controlled impact-tool, a piston-chamber and piston, a valve for controlling the movements of the piston consisting of a tubular shell having opposing pressure-surfaces of different areas to which the motive fluid is admitted to move the valve in opposite directions, a valve-block having ports and passages connected respectively with opposite ends of the piston-chamber and controlled by said valve to alternately admit and exhaust the motive fluid to and from the opposite ends of the piston, an auxiliary port connected with one of said passages and controlled by said valve to provide additional means for exhausting the fluid from one end of the piston-chamber.

35. In a fluid-controlled impact-tool, a piston-chamber and piston, and source of fluid-supply, a valve for controlling the movements of the piston, said valve being provided with opposing pressure-surfaces of different areas to which the motive fluid is admitted to move the valve in opposite directions, an exhaust-port opened by the piston near the end of its rearward stroke to exhaust the fluid from the largest area of the valve, a live-air passage leading directly from the source of supply to the piston-chamber, a passage leading from the piston-chamber to said larger area of the valve, said last-mentioned passage having two ports opening into the piston-chamber, one of said ports being connected to said live-air passage by a groove in the piston when the latter is near the end of its forward stroke, the other of said ports being adapted by the shifting of the valve to admit an additional amount of fluid to the larger area of the valve on the rearward stroke of the piston.

36. In a fluid-controlled impact-tool, a piston-chamber and piston, and source of fluid-supply, a valve for controlling the movements of the piston, said valve being provided with opposing pressure-surfaces of different areas to which the motive fluid is admitted to move the valve in opposite directions, an exhaust-port opened by the piston near the end of its rearward stroke to exhaust the fluid from the largest area of the valve, a live-air passage leading directly from the source of supply to the piston-chamber, a passage leading from the piston-chamber to said larger area of the valve, said last-mentioned passage having two ports opening into the piston-chamber, one of said ports being always closed by the piston except when the latter is near the end of its forward stroke, the other of said ports being always open to the piston-chamber except when the piston is near the end of its forward stroke and is adapted by the shifting of the valve to alternately admit and exhaust the motive fluid to and from the larger area of the valve.

37. In a fluid-controlled impact-tool, a piston-chamber and piston, and source of fluid-supply, a valve for controlling the movements of the piston, said valve being provided with opposing pressure-surfaces of different areas to which the motive fluid is admitted to move the valve in opposite directions, an exhaust-port opened by the piston near the end of its rearward stroke to exhaust the fluid from the largest area of the valve, a live-air passage leading directly from the source of supply to the piston-chamber, a passage leading from the piston-chamber to said larger area of the valve, said last-mentioned passage having two ports opening into the piston-chamber, one of said ports being controlled by the piston and opened by the latter to admit motive fluid to the larger area of the valve and the other of said ports being controlled by the piston to alternately admit the motive fluid to and exhaust it from the larger area of the valve during the travel of the piston.

38. In a fluid-controlled impact-tool, a piston-chamber and piston, a valve-block having a valve-chamber of different diameters, a tubular valve for controlling the movements of the piston, means controlled by the piston for actuating the valve, said valve being provided with a series of holes or ports opening into the interior of the valve, a port in said valve-block connected by a passage to one end of the piston-chamber and adapted to register with one or more of said holes or ports in the valve when the latter is at the end of its movement in one direction, a passage leading from the opposite end of the piston-chamber provided with two ports, one of said last-mentioned ports opening into the smaller diameter of the valve-chamber, the other of said ports opening into the larger diameter of the valve-chamber forward of said valve when the latter is at the end of its rearward movement.

39. In a fluid-controlled impact-tool, a piston-chamber and piston, a valve-block having a valve-chamber of different diameters, a tubular valve for controlling the movements of the piston, means controlled by the piston for actuating the valve, said valve having an exterior annular groove, a port in said valve-block connected by a passage to one end of the piston-chamber and adapted to register with said groove in the valve when the latter is at the end of its movement in one direction, a passage leading from the opposite end of the piston-chamber provided with two ports, one of said last-mentioned ports opening into the smaller diameter of the valve-chamber, the other of said ports being open to the larger diameter of the valve-chamber forward of said valve when the latter is in its rearward position.

40. In a fluid-controlled impact-tool, a piston-chamber and piston, a valve-block having a valve-chamber and a valve therein for controlling the movements of the piston, a retaining-head having a bore of different diameters in alinement with the valve-chamber and separated from the latter by a removable partition, a throttle-valve located in the larger bore of the retaining-head and provided with a rearwardly-projecting stem of diameter to fit the smaller bore of the head, said throttle-valve being adapted to be seated in the head when in rearward position and means for normally holding said throttle-valve in seated position.

41. In a fluid-controlled impact-tool, a piston-chamber and piston, a valve-block having a valve-chamber and a valve therein for controlling the movement of the piston, a retaining-head having a bore of different diameters in alinement with the valve-chamber and separated from the latter by a removable partition, a throttle-valve located in the larger bore of the retaining-head and adapted to be seated therein when in a rearward position, means for normally holding the throttle-valve in seated position, a stem located in the smaller bore of the head and engaging said throttle-valve, a grasping-handle for holding the tool to the work and adapted to hold said throttle-valve in an unseated position when the tool is held to the work.

42. In a fluid-controlled impact-tool, a piston-chamber and piston, a valve-block having a valve-chamber and a valve therein for controlling the movements of the piston, a retaining-head having a bore of different diameters in alinement with the valve-chamber, a throttle-valve located in the larger bore of the retaining-head and provided with a rearwardly-projecting stem of a diameter corresponding to the smaller bore of the head, a removable partition which separates the valve-chamber from said bore in the head, a port in the forward side of said partition in alinement with the valve-chamber, said throttle-valve being adapted to be seated in said head when in a rearward position, a grasping-handle for holding the tool to the work and adapted to hold said throttle-valve in an unseated position when the tool is held to the work.

43. In a fluid-controlled impact-tool, a piston-chamber and piston, a source of fluid-pressure, a valve for controlling the movements of the piston, said valve being provided with opposing pressure-surfaces of different areas to which the motive fluid is admitted to move the valve in opposite directions and to the smaller of which areas the motive fluid is constantly admitted to press the valve in one direction, means controlled by said piston for actuating said valve, an auxiliary port controlled by the piston and opened by the latter to admit an additional amount of motive fluid to the larger pressure-surface of the valve to retain the latter in position when the piston is on its rearward stroke.

44. In a fluid-controlled impact-tool, a piston-chamber and piston, a source of fluid-pressure, a valve for controlling the movements of the piston, said valve being provided with opposing pressure-surfaces of different areas to which the motive fluid is admitted to move the valve in opposite directions, and against the smaller of which areas the motive fluid constantly acts to press the valve in one direction, means controlled by said piston for actuating said valve, an auxiliary port controlled by the piston, and closed by the latter when at one end of its stroke, said auxiliary port when uncovered by the piston being adapted by the shifting of the valve to alternately admit motive fluid to and exhaust it from the larger area of the valve.

45. In a fluid-controlled impact-tool, a piston-chamber and piston, a source of fluid-pressure, a valve for controlling the movements of the piston, said valve being provided with opposing pressure-surfaces of different areas to which the motive fluid is admitted to move the valve in opposite directions, and against the smaller of which areas the motive fluid constantly acts to press the valve in a forward direction, means controlled by said piston for actuating said valve, an auxiliary port controlled by the piston and opened by the latter on its rearward stroke to admit an additional amount of motive fluid to the larger pressure-surface of the valve to retain the latter in a rearward position.

46. In a fluid-controlled impact-tool, a piston-chamber and piston, a source of fluid-pressure, a valve for controlling the movements of the piston, said valve being provided with opposing pressure-surfaces of different areas to which the motive fluid is admitted to move the valve in opposite directions, means controlled by said piston for actuating said valve, an auxiliary port controlled by the piston and closed by the latter when at one end of its stroke, said auxiliary port being open to the piston-chamber to exhaust the motive fluid from the larger pressure-surface of the valve when the piston is on its forward stroke and adapted by the shifting of said valve to admit an additional amount of motive fluid to said larger pressure-surface when the piston is on its rearward stroke.

47. In a fluid-controlled impact-tool, a piston-chamber and piston, a source of fluid-pressure, a valve for controlling the movements of the piston, said valve being provided with opposing pressure-surfaces of different areas to which the motive fluid is admitted to move the valve in opposite directions, and against the smaller of which areas the motive fluid constantly acts to press the valve in one direction, means controlled by said piston for actuating said valve, an auxiliary port controlled by the piston and opened by the latter, after the movement of the valve has been effected by the piston, to admit an additional amount of motive fluid to the larger pressure-surface of the valve to retain the latter in position.

48. In a fluid-controlled impact-tool, a cylinder, a valve-block, a retaining-head, means for holding said cylinder, valve-block and retaining-head in assembled position, a controlling-valve in said valve-block, said retaining-head having a longitudinal bore of different diameters, the smaller bore being at the rearward end of the head, a throttle-valve provided with a rearwardly-projecting stem having a diameter corresponding to the bore of the head, said throttle-valve being adapted to be seated in the head when in a rearward position, means for normally holding said throttle-valve in seated position, a grasping-handle adapted for holding the tool to the work, said grasping-handle and stem being adapted for holding said throttle-valve in an unseated position when the tool is pressed to the work.

49. In a fluid-controlled impact-tool, a cylinder, a valve-block, a retaining-head, means for holding said cylinder, valve-block and retaining-head in assembled position, a controlling-valve in said valve-block, said retaining-head having a longitudinal bore of different diameters, the smaller bore being at the rearward end of the head, a throttle-valve provided with a rearwardly-projecting stem having a diameter corresponding to the bore of the head, said throttle-valve being adapted to be seated in the head when in a rearward position, means for closing the forward end of said bore after the throttle-valve and stem are placed in position therein, a passage in said retaining-head for conducting the motive fluid from the throttle-valve to a port in the valve-block, an auxiliary passage leading from said first-mentioned passage to said bore in the head forward of the end of said throttle-valve.

50. In an impact-tool, a cylinder provided with screw-threads, a threaded member or sleeve adapted to engage said cylinder, a valve-block contained in said sleeve, a retaining-head for the valve-block having a flange engaged by said sleeve, a split clamp having a bore of different diameters, one bore adapted to engage said sleeve and the other to engage the cylinder, said clamp being provided with projecting lugs, a threaded bolt engaging said lugs and having a jam-nut thereon.

51. In an impact-tool, a cylinder, a member or sleeve in threaded engagement with said cylinder, a valve-block contained in said sleeve, a controlling-valve in said valve-block, a retaining-head for said valve-block, a split clamp having a bore of different diameters and provided with projecting lugs, a threaded bolt engaging said lugs, one part of said clamp being adapted to grip the cylinder and the other part to grip the sleeve, said sleeve having a flange at its rear end adapted to engage said retaining-head to hold the latter in position.

52. In an impact-tool, a cylinder, a member or sleeve in threaded engagement with said cylinder, a valve-block contained in said sleeve, a controlling-valve in said valve-block, a retaining-head for said valve-block, a plate located between said valve-block and cylinder, a split clamp having a bore of different diameters and adapted to grip said sleeve and cylinder, said sleeve being provided with an internal annular flange at its rear end adapted to engage said retaining-head to hold the latter in position.

53. In an impact-tool, a cylinder provided with a forward head having a longitudinal bore of different diameters, a striker operating in the bore and having a stem of smaller diameter projecting rearwardly into the cylinder, a bushing fitting into said bore to prevent displacement of the striker and having an opening to receive the shank of the working tool, said striker having a series of longitudinal grooves in its largest diameter.

54. In an impact-tool, a cylinder provided with a forward head having a longitudinal bore of different diameters, a striker operating in the bore and having a stem of smaller diameter projecting rearwardly into the cylinder, a bushing fitting into said bore to prevent displacement of the striker and having an opening to receive the shank of the working tool, said striker having a series of longitudinal grooves in its largest diameter and an exhaust-port opening into the bore of the head between the rear end of said bushing and the forward end of said striker.

55. In a fluid-controlled impact-tool, a piston-chamber and piston, a tubular valve for controlling the movements of the piston, means controlled by said piston for actuating said valve, a valve-block having a valve-chamber of different diameters and a port opening into said valve-chamber, a retaining-head for the valve-block having a bore of different diameters in alinement with the valve-chamber and separated from the latter by a partition, a throttle-valve located in the larger bore of said head and provided with a rearwardly-projecting stem of a diameter to fit the smaller bore of the head, said partition being adapted to limit the travel of said valve to prevent closing said port in the valve-block.

56. In a fluid-controlled impact-tool, a piston-chamber and piston, a tubular valve for controlling the movements of the piston, means controlled by said piston for actuating said valve, a valve-block having a valve-chamber of different diameters and a port opening into said valve-chamber, a retaining-head for the valve-block having a bore of different diameters in alinement with the valve-chamber and separated from the latter by a partition, a throttle-valve located in the larger bore of said head and provided with a rearwardly-projecting stem of a diameter to fit the smaller bore of the head, said partition being adapted to limit the travel of said valve to prevent closing said port in the valve-block, and a port in the forward side of said partition in alinement with the valve-chamber.

57. In a fluid-controlled impact-tool, a piston-chamber and piston, a tubular valve for controlling the movements of the piston, means controlled by said piston for actuating said valve, a valve-block having a valve-chamber of different diameters and a port opening into said valve-chamber, a retaining-head for the valve-block adapted to limit the travel of the valve to prevent closing said port, and a port in the forward side of the retaining-head in alinement with the valve-chamber which is always open to the interior of the valve.

58. In a fluid-controlled impact-tool, a piston-chamber and piston, a valve-block having a valve-chamber of different diameters, a valve for controlling the movements of the piston having opposing pressure-surfaces of different areas, means controlled by the piston for actuating the valve, a passage leading from one end of the piston-chamber provided with two ports, one of said ports opening into the smaller and the other opening into the larger diameter of the valve-chamber, the latter port being adapted to admit the motive fluid from said passage to the larger area of the valve when the latter is in one position, said port being opened by the valve to exhaust the motive fluid from said passage when the valve is in an opposite position.

In testimony whereof I have affixed my signature in presence of two witnesses.

GEORGE L. BADGER.

Witnesses:
WILLIAM A. COPELAND,
ROBERT WALLACE.